(12) United States Patent
Gross et al.

(10) Patent No.: US 11,556,555 B2
(45) Date of Patent: Jan. 17, 2023

(54) AUTOMATIC DATA-SCREENING FRAMEWORK AND PREPROCESSING PIPELINE TO SUPPORT ML-BASED PROGNOSTIC SURVEILLANCE

(71) Applicant: Oracle International Corporation, Redwood Shores, CA (US)

(72) Inventors: Kenny C. Gross, Escondido, CA (US); Aakash K. Chotrani, Redmond, WA (US); Beiwen Guo, Redwood City, CA (US); Guang C. Wang, San Diego, CA (US); Alan P. Wood, San Jose, CA (US); Matthew T. Gerdes, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 17/081,859

(22) Filed: Oct. 27, 2020

(65) Prior Publication Data
US 2022/0129457 A1    Apr. 28, 2022

(51) Int. Cl.
*G06F 11/00*    (2006.01)
*G06F 16/2458*    (2019.01)
*G06N 20/00*    (2019.01)
*G06F 11/30*    (2006.01)

(52) U.S. Cl.
CPC ...... *G06F 16/2474* (2019.01); *G06F 11/3089* (2013.01); *G06N 20/00* (2019.01)

(58) Field of Classification Search
CPC .............. G06F 11/079; G06F 11/3447; G06F 11/3452; G06F 11/3089; G06F 11/3055; G06F 11/3058
See application file for complete search history.

(56) References Cited

U.S. PATENT DOCUMENTS

| | | | |
|---|---|---|---|
| 9,984,334 B2 * | 5/2018 | Nikovski | G06N 20/00 |
| 10,699,007 B2 * | 6/2020 | Gross | G06F 11/3096 |
| 2008/0082195 A1 * | 4/2008 | Samardzija | G05B 23/024 700/109 |
| 2018/0060151 A1 * | 3/2018 | Gross | G06F 11/34 |

* cited by examiner

*Primary Examiner* — Charles Ehne (57) ABSTRACT

The disclosed embodiments relate to a system that automatically selects a prognostic-surveillance technique to analyze a set of time-series signals. During operation, the system receives the set of time-series signals obtained from sensors in a monitored system. Next, the system determines whether the set of time-series signals is univariate or multivariate. When the set of time-series signals is multivariate, the system determines if there exist cross-correlations among signals in the set of time-series signals. If so, the system performs subsequent prognostic-surveillance operations by analyzing the cross-correlations. Otherwise, if the set of time-series signals is univariate, the system performs subsequent prognostic-surveillance operations by analyzing serial correlations for the univariate time-series signal.

20 Claims, 7 Drawing Sheets

AUTOMATIC DATA-SCREENING FRAMEWORK AND PREPROCESSING PIPELINE TO SUPPORT ML-BASED PROGNOSTIC SURVEILLANCE

BACKGROUND

Field

The disclosed embodiments generally relate to techniques for using machine-learning (ML) models to perform prognostic-surveillance operations based on time-series sensor signals. More specifically, the disclosed embodiments relate to an automatic data-screening framework and an associated intelligent data preprocessing pipeline that support ML-based prognostic surveillance techniques.

Related Art

Large numbers of sensors are presently deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the critical assets.

Machine-learning (ML) techniques are commonly used to perform prognostic-surveillance operations on time-series sensor data, and also for validating the integrity of the sensors themselves. ML-based prognostic-surveillance techniques typically operate by training an ML model (also referred to as an "inferential model") to learn correlations among time-series signals. The trained ML model is then placed in a surveillance mode where it is used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

However, it is often challenging to educate ML system end users about basic principles from statistics and associated ML requirements so that users can execute an ML program correctly using datasets that will yield meaningful results. A common challenge for users of ML techniques is matching appropriate datasets to specific ML techniques. It is also difficult to know in advance whether there is any degree of correlation among the signals in the dataset. If not, the signals can only be analyzed using univariate ML techniques. In contrast, if there is some degree of correlation among the signals, the signals are best analyzed using a multivariate technique, such as the multivariate state estimation technique (MSET).

Other challenges arise from problems with the quality of the time-series signals. These problems include: missing values in time-series signals; low-resolution quantized signals; and "stuck-at faults" in sensors that cause flat spots in signals that degrade the performance of correlation-based ML techniques. Data acquisition systems (DAQs) can also be a source of problems because they often sample different sensors with varying sampling rates, and have clocks that are not synchronized. This leads to distorted correlations that can cause large numbers of false alarms and missed alarms. Another challenge is that time-series data often includes spikes in one or more signals, which are often flagged as anomalous when they should not be, especially when the spikes are a natural feature of the physical processes being monitored. Also, with conventional ML techniques, the sheer volume of data can create challenges in terms of storage capacity and associated overhead costs. If we attempt to save every fine-grained observation over a long time horizon, the overhead costs for ML processing can greatly increase.

Hence, what is needed is a technique for effectively matching time-series datasets with appropriate prognostic-surveillance techniques and for dealing with quality problems in the time-series signals.

SUMMARY

The disclosed embodiments relate to a system that automatically selects a prognostic-surveillance technique to analyze a set of time-series signals. During operation, the system receives the set of time-series signals obtained from sensors in a monitored system. Next, the system determines whether the set of time-series signals is univariate or multivariate. When the set of time-series signals is multivariate, the system determines if there exist cross-correlations among signals in the set of time-series signals. If so, the system performs subsequent prognostic-surveillance operations by analyzing the cross-correlations. Otherwise, if the set of time-series signals is univariate, the system performs subsequent prognostic-surveillance operations by analyzing serial correlations for the univariate time-series signal.

In some embodiments, prior to determining whether the set of time-series signals is univariate or multivariate, the system determines whether the received set of time-series signals are valid time-series signals composed of sequences of numerical values. If the set of time-series signals are not valid time-series signals, the system rejects the set of time-series signals and notifies a system user.

In some embodiments, when the set of time-series signals is univariate, the system determines whether the univariate signal is stationary or dynamic. If the univariate signal is stationary, the system uses a serial correlation technique for stationary, univariate signals to analyze the univariate signal during the subsequent prognostic-surveillance operations. Otherwise, if the univariate signal is dynamic, the system uses a serial correlation technique for dynamic, univariate signals to analyze the univariate signal during the subsequent prognostic-surveillance operations.

In some embodiments, determining whether the univariate signal is stationary or dynamic involves performing a slope calculation to determine stationarity, or alternatively a Kolmogorov-Smirnov (KS) test.

In some embodiments, using the serial correlation technique for dynamic, univariate signals involves using: a Fourier decomposition and reconstruction technique when the signal includes periodic components; a symbolic aggregate approximation (SAX) technique when the signal includes repeating shaped components with no periodicity; and a staggered-sampling/hyperSPRT technique when the signal includes no repeating patterns.

In some embodiments, when the set of time-series signals is multivariate, the system removes: signals with a significant number of missing values; signals that lack cross-correlations with other signals; and flat signals. If at least two signals remain after removing the signals, the system performs the subsequent prognostic-surveillance operations by analyzing the cross-correlations. Otherwise, the system rejects the set of time-series signals and notifies a system user.

In some embodiments, while performing the subsequent prognostic-surveillance operations by analyzing the cross-correlations, the system uses a multivariate state estimation technique (MSET) model to analyze the cross-correlations.

In some embodiments, while using the MSET model to analyze the cross-correlations, the system uses the MSET model to generate estimated values based on subsequently received time-series signals from the monitored system. Next, the system performs a pairwise differencing operation between actual values and the estimated values for the subsequently received time-series signals to produce residuals. Finally, the system analyzes the residuals to detect the incipient anomalies in the monitored system.

In some embodiments, when the set of time-series signals is multivariate, prior to the subsequent prognostic-surveillance operations, the system feeds the set of time-series signals through a data preprocessing pipeline, which includes preprocessors that perform one or more of the following operations on the set of time-series signals: missing value imputation; despiking; dequantization; unstairstepping; analytic resampling process (ARP) uniform sampling; ARP phase synchronization; multivariate memory vectorization; and tamperproofing.

In some embodiments, when the set of time-series signals is univariate, prior to the subsequent prognostic-surveillance operations, the system feeds the set of time-series signals through a data preprocessing pipeline, which includes preprocessors that perform one or more of the following operations on the set of time-series signals: ARP resampling to fill in missing values; despiking; dequantization; unstairstepping; and tamperproofing.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
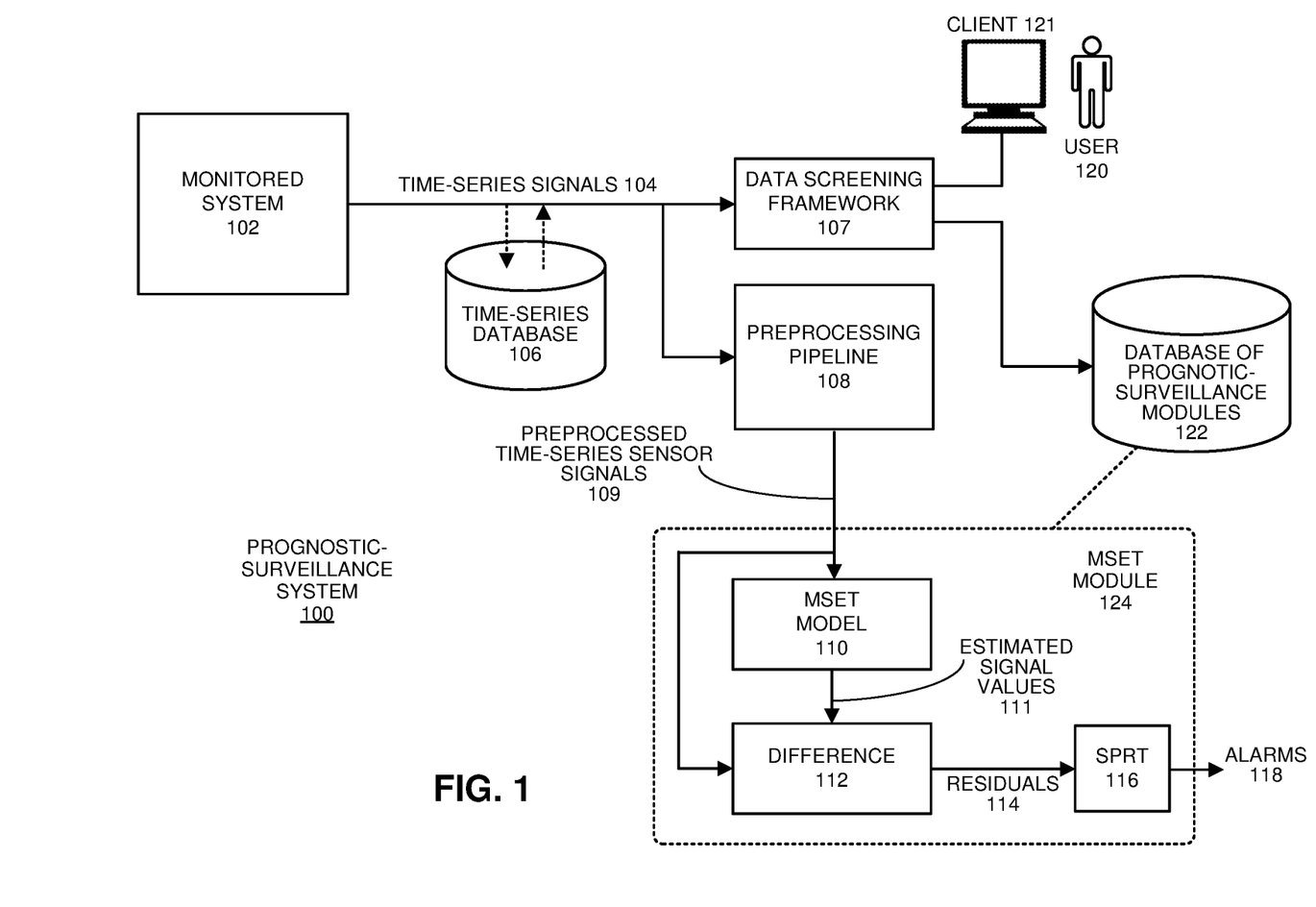
FIG. 1 illustrates an exemplary prognostic-surveillance system in accordance with the disclosed embodiments.

Before describing the data-screening framework and associated preprocessing pipeline further, we first describe an exemplary prognostic-surveillance system in which the techniques can operate. FIG. 1 illustrates a prognostic-surveillance system 100 that accesses a time-series database 106, containing time-series signals in accordance with the disclosed embodiments. As illustrated in FIG. 1, prognostic-surveillance system 100 operates on a set of time-series signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into preprocessing pipeline 108. Preprocessing pipeline 108 modifies time-series signals 104 to remedy various sensor- and signal-related problems in time-series signals 104 as is discussed in more detail below with reference to FIG. 5.

After passing through preprocessing pipeline 108, time-series signals 104 feed into MSET pattern-recognition model 110 within MSET module 124. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 110 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 110 predicts what each signal should be, based on other correlated variables; these are the "estimated signal values" 111 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate alarms 118. (For a description of the SPRT model, please see Wald, Abraham. June 1945. "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so that such problems can be avoided or proactively fixed.

Time-series signals 104 also feed into a data-screening framework 107, which automatically analyzes the characteristics of time-series signals 104 to select a suitable prognostic-surveillance technique to monitor time-series signals 104. Note that this selection process may involve interacting with a user 120 through a client 121. After selecting a prognostic-surveillance technique, data-screening framework 107 retrieves a module that implements the selected prognostic-surveillance technique from a database containing different types of prognostic-surveillance modules 122. In the example illustrated in FIG. 1, an MSET module 124, which makes use of MSET model 110, is selected from module database 122. Note that the process for selecting a suitable prognostic-surveillance technique is described in more detail below with reference to the flow chart illustrated in FIGS. 4A-4B.

Figure 2:
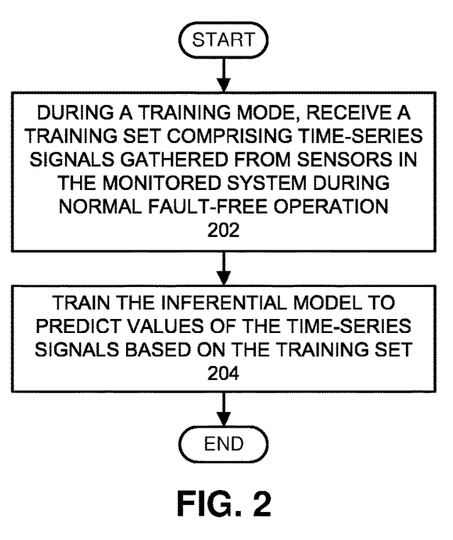
FIG. 2 presents a flow chart illustrating a process for training an inferential model in accordance with the disclosed embodiments.
Figure 3:
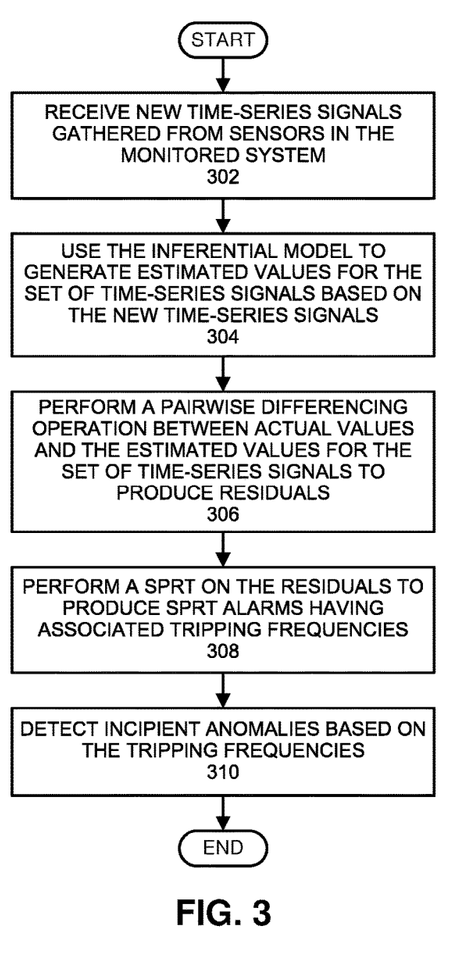
FIG. 3 presents a flow chart illustrating a process for using an inferential model to perform a prognostic-surveillance operation in accordance with the disclosed embodiments.

MSET module 124 operates generally as follows. During a training mode, which is illustrated in the flow chart in FIG. 2, the system receives a training set comprising time-series signals gathered from sensors in the monitored system under normal fault-free operation (step 202). The system then trains the inferential model to predict values of the time-series signals based on the training set (step 204). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). Next, the system analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Data-Screening Framework

Time-series signals that are analyzed by prognostic-surveillance systems can be univariate (comprising collections of individual signals that are not correlated with other signals), or multivariate (comprising two or more signals that have a statistically significant degree of cross-correlation with each another). They can also be heterogeneous collections of both univariate and multivariate signals. Moreover, both univariate and multivariate signals can fall into numerous sub-classes of signals, which are essential to know before applying ML-based prognostic-surveillance to them. For example, possible classes of signals include:

Signals from stationary stochastic processes;
Signals from dynamic processes with various types of noise distributions superimposed on deterministic structural components;
Dynamic signals comprising envelopes of periodic components;
Dynamic signals without repeating patterns;
Dynamic signals with repeating shape-patterns that are not periodic;
Stationary or dynamic signals with missing values;
Quantized signals;
Signals with spiky content;
Signals that exhibit "clock mismatch" issues in their timestamps; and
Signals with excessive flat content.

We have developed a data-screening system that is able to sift through a large collection of time-series sensor signals and automatically classify the signals as being univariate or multivariate along with associated sub-classifications. The system also identifies signal idiosyncrasies that cause problems with ML-based prognostic techniques, such as missing values, quantized signals, and clock-mismatch issues.

Our data-screening protocol uses a number of "pre-checks" for time-series signals and an associated API to facilitate subsequent prognostic anomaly detection operations. A sequence of prechecks is illustrated in the flow chart that appears in FIGS. 4A-4B. The system starts by determining whether the received dataset of time-series signals 401 comprises valid time-series signals composed of sequences of numerical values (step 402). This involves determining if the dataset is tabulated by row and column and is only composed of numeric data. Note that this is the fundamental requirement for any time-series-regression-type ML technique, but it may not be obvious to inexperienced ML users. If the received set of time-series signals 401 is not valid, the customer is notified and the dataset is rejected (step 403).

Figure 4A:
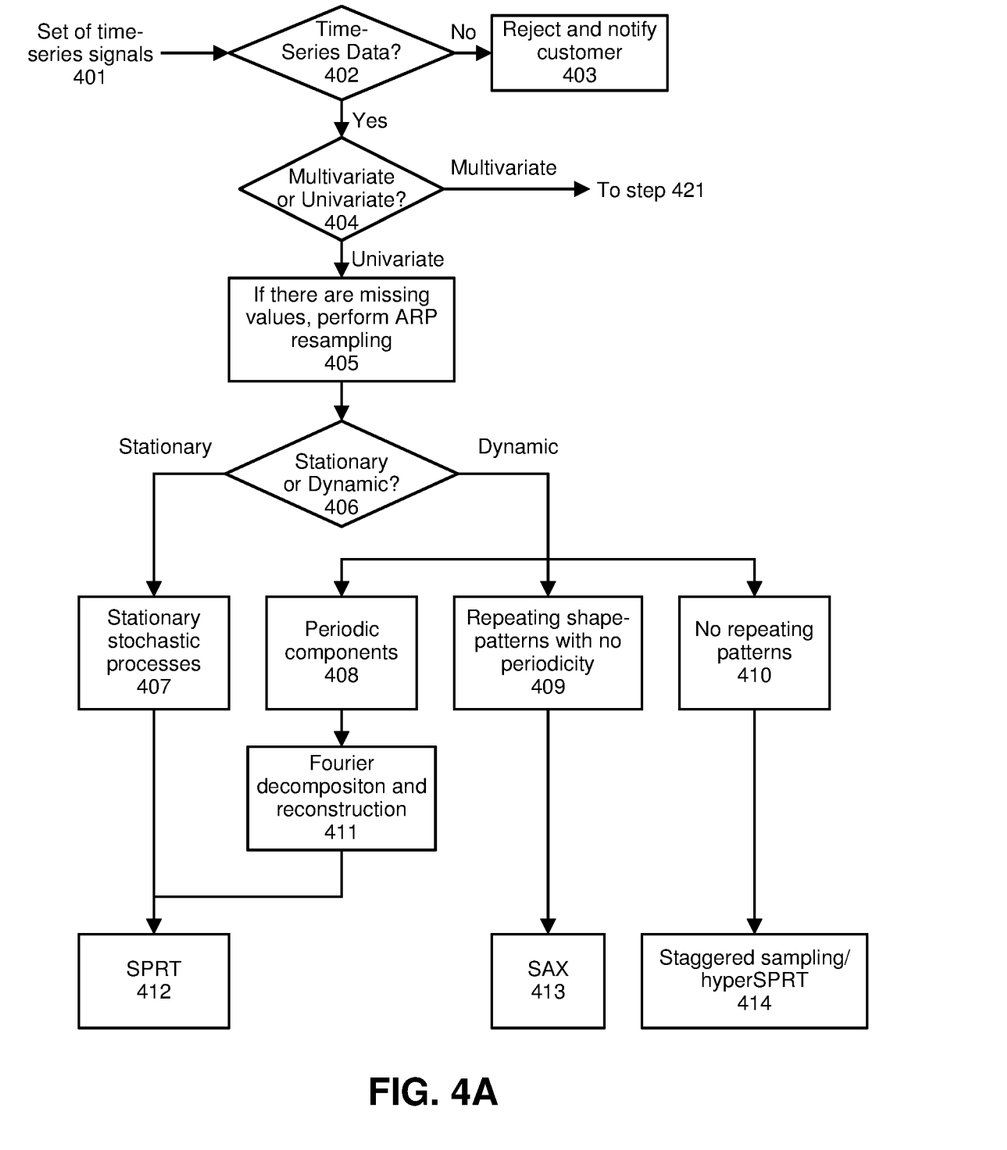
FIG. 4A presents the first portion of a flow chart for the data-screening process in accordance with the disclosed embodiments.

Next, if the received set of time-series signals 401 passes the test in step 402, the system determines whether the set of time-series signals 401 is multivariate or univariate (which involves determining whether the number of columns in the dataset is two or greater). If the set of time-series signals 401 is multivariate, the system proceeds to step 421 in the flow chart illustrated in FIG. 4B. Otherwise, if the set of time-series signals 401 is univariate, and if there exist missing values in the set of time-series signals 401, the system performs an ARP resampling process (step 405) to fill in these missing values. (The ARP resampling technique is described in U.S. patent application Ser. No. 16/168,193, entitled "Automated Analytic Resampling Process for Optimally Synchronizing Time-Series Signals," by inventors Kenny C. Gross, et al., filed on 23 Oct. 2018, which is hereby incorporated by reference herein.)

Next, the univariate signal is tested to see if it is stationary or dynamic (step 406). This can involve performing a slope calculation to determine stationarity, or a Kolmogorov-Smirnov (KS) test. A stationary signal is a signal with stationary means, which is generated by one or more stationary stochastic processes 407. This is the simplest type of univariate signal, and the sequential probability ratio test (SPRT) 412 provides an advantageous prognostic-surveillance technique for analyzing this type of signal. SPRT provides the shortest mathematically possible time-to-detection (TTD) for discovering an anomaly and provides the fewest possible false-alarm probabilities (FAPs) and missed-alarm probabilities (MAPs) (See Gross, K. C., & Dhanekula, R. Multivariate SPRT for Improved Electronic Prognostics of Enterprise Computing Systems. *Proc. 65th Meeting of the Machinery Failure Prevention Technology Society*, MFPT2012, April 2012.)

On the other hand, if the univariate signal is dynamic, we categorize it into one of three different categories: periodic components 408, repeating shape-patterns with no periodicity 409, and no repeating patterns 410. For dynamic signals with envelopes of periodic components 408, Fourier techniques make it possible to decompose most of the dynamic signals into an envelope of sinusoidal components. Based on that, we found that the deterministic dynamics in the form of sinusoidal components can be characterized, and the same deterministic dynamics in the new signal can be constructed and subtracted to create residuals. This process is referred to as "Fourier decomposition and reconstruction" (step 411). Next, the residuals can be analyzed using SPRT 412 for high efficiency anomaly discovery. (For example, see "Spectral Decomposition and Reconstruction of Telemetry Signals from Enterprise Computing Systems," K. C. Gross and E. Schuster, Proc. 2005 *IEEE Intl Multiconference in Computer Science & Computer Eng.*, Las Vegas, Nev., June 2005. Also see U.S. patent application Ser. No. 16/419,846, entitled "Compensating for Out-of-Phase Seasonality Modes in Time-Series Signals to Facilitate Prognostic-Surveillance Operations" by inventors Guang C. Wang, et al., filed 22 May 2019, which is hereby incorporated by reference herein.)

For dynamic signals with repeating shape-patterns with no periodicity 409, the symbolic aggregate approximation (SAX) technique 413 can be used to facilitate prognostic-surveillance operations. (See "Experiencing SAX: a novel symbolic representation of time series," J. Lin, E. Keogh, L. Wei, and S. Lonardi. *Data Mining and Knowledge Discovery* 15 (2): 107-144, 2007.)

For dynamic signals with no repeating patterns 410, it is nearly impossible to detect anomalies in the dynamic structure of the signal because there is no "ground truth" signal. In this case, we can use the staggered sampling or hyper-SPRT techniques to facilitate prognostic-surveillance operations. (See "Round-Robin Staggered-Imputation (RRSI) Algorithm for Enhanced Real-Time Prognostics for Dense-Sensor IoT Applications" Int'l Conf. Internet Computing and Internet of Things|ICOMP'16, pp. 169-174, 2016. Also, see U.S. Pat. No. 5,987,399, entitled "Ultrasensitive Surveillance of Sensors and Processes," by inventors Kenny C. Gross, et al., 16 Nov. 1999.)

Figure 4B:
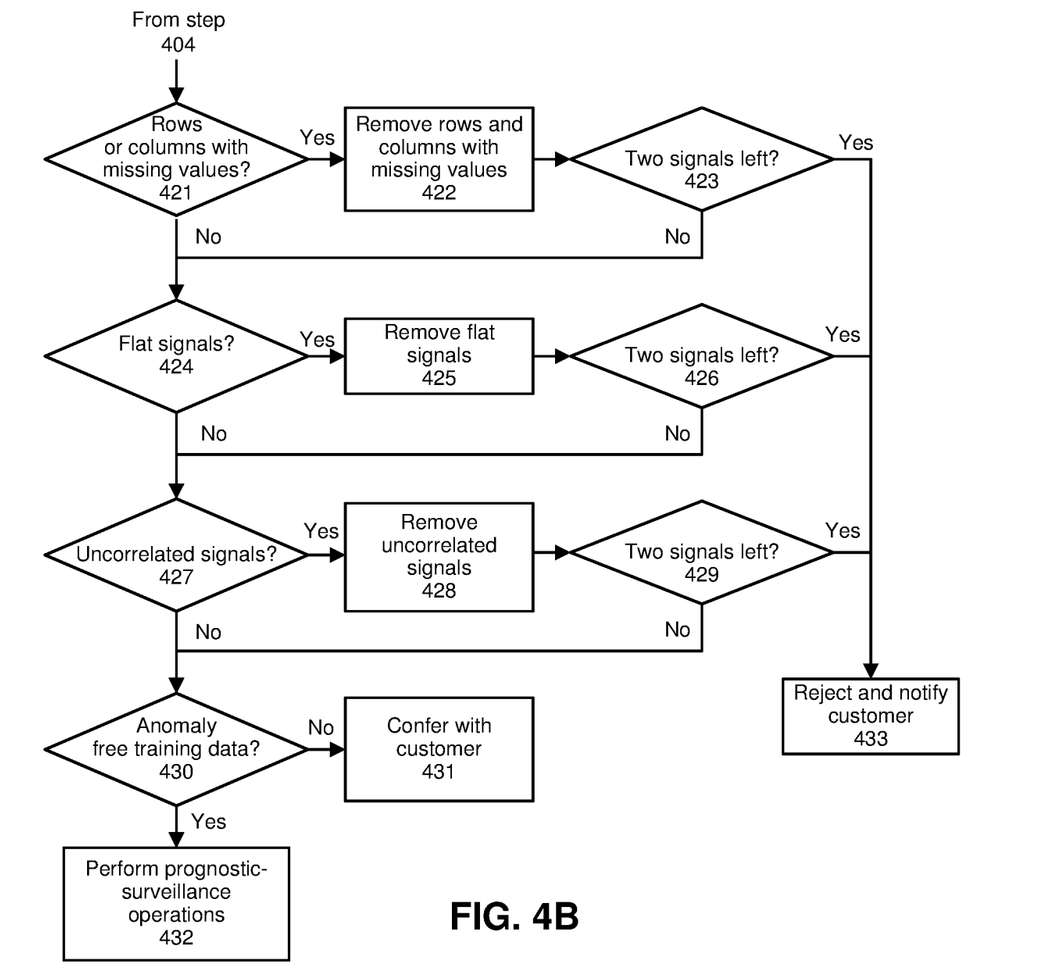
FIG. 4B presents the second portion of a flow chart for the data-screening process in accordance with the disclosed embodiments.

FIG. 4B illustrates a portion of the flow chart for the multivariate case. Multivariate ML techniques typically look for underlying correlations between the sensor signals rather than analyzing them individually, so a different set of data prechecks are appropriate. The system starts by determining whether any rows or columns in the dataset have missing values (step 421). If any rows are full of missing values, correlations involving the row cannot be exploited by ML techniques. This means such rows are not usable and need to be removed from the dataset (step 422). The same rule applies to columns full of missing values. If fewer than two signals are left (step 423), the system rejects the dataset and notifies the customer (step 433).

Next, the system determines if there exist any flat signals (step 424). If so, the system removes the flat signals (step 425). Note that flat sensor signals comprising a sequence of constant values are not useful for ML techniques because there exist no correlations between a flat signal and a varying signal. Thus, signals with long sequences of constant values will be removed from the dataset. If fewer than two signals are left (step 426), the system rejects the dataset and notifies the customer (step 433).

Next, the system determines if there exist any uncorrelated signals (step 427). If so, the system removes the uncorrelated signals (step 428). This can involve computing a correlation table for the N signals, which results in an N×N matrix, in which each off-diagonal element represents the correlation value for one signal pair. Empirical results indicate that a correlation of more than 0.3 provides predictive value. Hence, any signals with a correlation of less than 0.3 with other signals is removed from the dataset. If fewer than two signals are left (step 429), the system rejects the dataset and notifies the customer (step 433).

Finally, the system determines whether there exists anomaly-free training data (step 430), and whether this training data covers the full operating range of the sensors. This is important because if the training dataset has anomalies, the ML model will learn them as being "normal" and will not generate alarms when those anomalies occur. Also, if the training dataset does not cover the full operating range of the sensors, the ML model can generate an alert for an anomaly when the signals are in their normal operating range but are not covered by the training data. As a result, false alarms will occur. If no anomaly-free training data exists, it is necessary to confer with the customer (step 431).

After the dataset passes through the data-screening framework without being rejected, the dataset is in good shape, and no erroneous results are expected. In this case, the system proceeds to perform prognostic-surveillance operations (step 432), which can involve first feeding the set of time-series signals 401 through a preprocessing pipeline as is described in more detail below.

Preprocessing Pipeline

Some major challenges in applying ML prognostic techniques to time-series data have little to do with which ML techniques used, but instead involve sensor- and signal-related problems. These problems include: missing values in streaming sensor data, low-resolution and/or quantized signals, and "stuck-at" faults in sensors, which cause "flat spots," which are problematic for correlation-based ML techniques. Also, data acquisition systems (DAQs) can create problems because they often sample different sensors with varying sampling rates, and have clocks that are uncoordinated. This gives rise to distorted correlations that can create large numbers of false alarms and missed alarms for ML-based surveillance techniques. Another challenge is that many types of signals contain "spikes," which are often flagged as anomalous when they should not be, especially when the spikes are a natural feature in the physical processes being monitored. Additionally, the sheer volume of data can create challenges in terms of storage costs. If we desire to save every fine-grained observation forever, the overhead cost involved in ML processing significantly increases. Note that in many cases, most of the data in streaming sensor signals is random measurement noise, which increases processing and storage costs, but does not help in detecting anomalies in the underlying time-series data.

Figure 5:
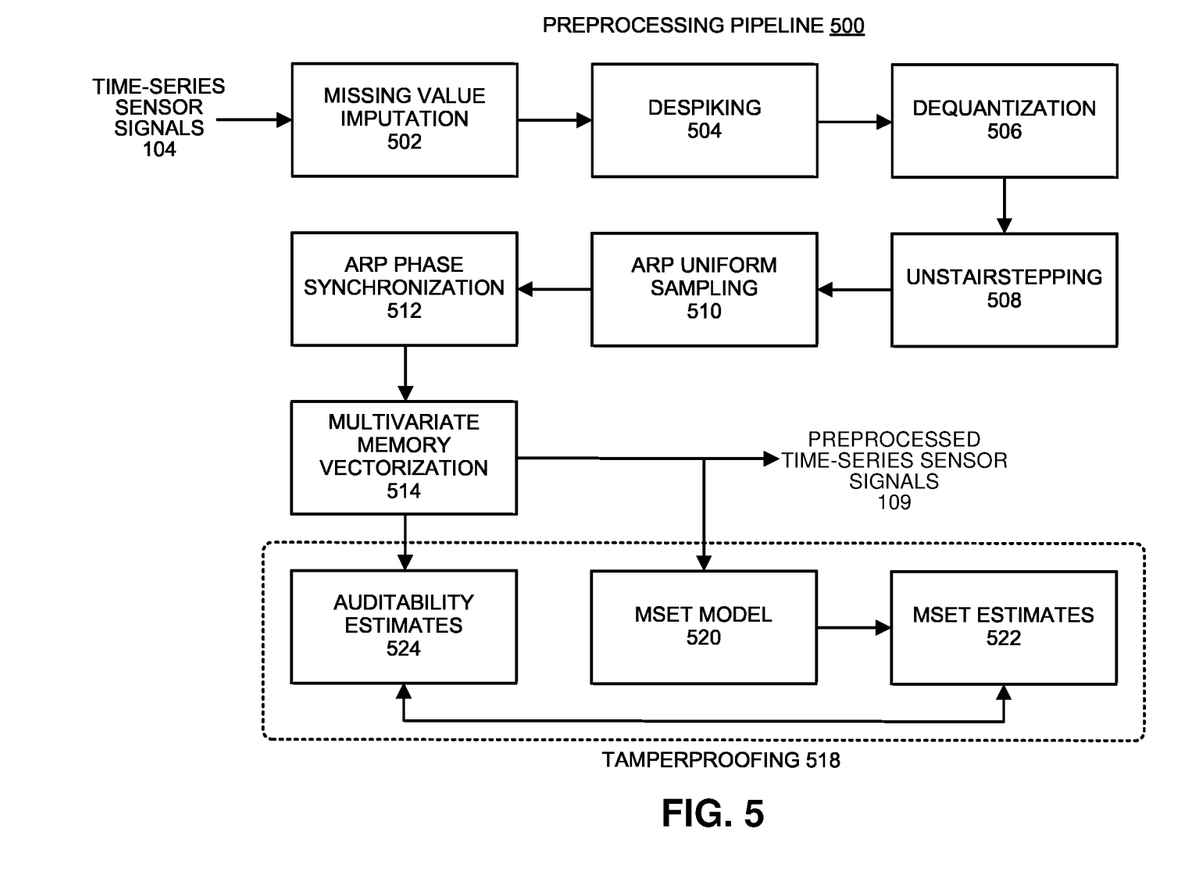
FIG. 5 illustrates an intelligent data preprocessing pipeline in accordance with the disclosed embodiments.

To deal with the above-described sensor- and signal-related problems, we have developed an intelligent data preprocessing pipeline that performs a series of data preprocessing procedures, which remove flaws from the dataset and improve the dataset before ML techniques are applied to the dataset. FIG. 5 illustrates such an intelligent data preprocessing pipeline 500, which includes a sequence of modules that perform a number of functions.

Missing value imputation module 502 fills in missing values in the dataset with highly accurate estimates based on the MSET-derived serial correlations using the existing values. (See U.S. patent application Ser. No. 16/005,495, entitled "Missing Value Imputation technique to Facilitate Prognostic Analysis of Time-Series Sensor Data," by inventors Guang C. Wang, et al., filed 11 Jun. 2018, which is incorporated by reference herein.)

Despiking module 504 detects spikes in the signals by characterizing a variety of statistical distributions of the signals. The captured spikes are then replaced with the signal average. (See U.S. patent application Ser. No. 16/215,345, entitled "Synthesizing High-Fidelity Signals with Spikes for Prognostic-Surveillance Applications" by inventors Guang C. Wang, et al., filed 18 Dec. 2018, which is incorporated by reference herein.)

Dequantization module 506 dequantizes low-resolution time-series signals to produce higher-resolution time-series signals. (See U.S. Pat. No. 10,496,084, entitled "Dequantizing Low-Resolution IOT Signals to Produce High-Accuracy Prognostic Indicators," by inventors Kenny C. Gross, et al., filed 6 Apr. 2018, which is incorporated by reference herein.)

Unstairstepping module 508 solves a problem where any slow sampling rate sensors simply repeats their last measured values to produce a higher sampling rate, so that all measured signals have a uniform sampling rate. In this case, the slower sampling rate sensors produce sequences of flat segments, resembling stair steps. Unstairstepping module 508 replaces such stairstepped signals with the higher-sampling rate signals that are produced using MSET-derived values. (See U.S. patent application Ser. No. 16/128,071, entitled "Replacing Stair-Stepped Values in Time-Series Sensor Signals with Inferential Values to Facilitate Prognostic-Surveillance Operations," by inventors Kenny C. Gross, et al., filed 11 Sep. 2018, which is incorporated by reference herein.)

ARP uniform sampling module 510 determines if the signals were sampled at different frequencies, in which case the observations of the slower signals are resampled to match the highest sampling rate of the signals. ARP phase synchronization module 512 adjusts out-of-phase observations due to the clock-synchronization disparities in measurement instrumentation by shifting and aligning the observations in the time domain. (For a description of ARP, see U.S. Pat. No. 7,292,659, entitled "Correlating and Aligning Monitored Signals for Computer System Performance Parameters," by inventors Kenny C. Gross, et al., filed 26 Sep. 2003, which is incorporated by reference herein.)

Multivariate memory vectorization module 514 solves a problem where the size of the large-scale time-series datasets are prohibitive for machine-learning use cases. During operation, multivariate memory vectorization module 514 extracts the optimal subset of vectors that represent the structure of the data and retains those in a totally lossless fashion, which preserves the exact statistical moments of the distributions. In this way, multivariate memory vectorization module 514 significantly reduces the volume of the data, and the data can be fully reconstituted later. (See U.S. Pat. No. 10,621,141, entitled "Multivariate Memory Vectorization Technique to Facilitate Intelligent Caching in Time-Series Databases" by inventors Kenny C. Gross, filed 20 Apr. 2020, which is incorporated by reference herein.)

The preprocessing pipeline illustrated in FIG. 5 can also include optional tamperproofing functionality 518. This tamperproofing involves using an MSET model 520 to generate MSET estimates 522. This makes it possible to subsequently compare the MSET estimates 522 with previously generated auditability estimates 524 to determine whether a dataset has been tampered with.

In preprocessing pipeline 500, missing value imputation module 502 is executed first, because none of the other data preprocessing techniques can be applied to a dataset that has missing values. The time-series signals then proceed through despiking module 504, where sparse statistical outliers in the form of signal spikes are identified and eliminated. Next, dequantization module 506 is used to dequantize any highly quantized signals. Note that dequantization module 506 works with up to 20 quantization levels. If there exist more than 20 quantization levels, we instead use unstairstepping module 508 to convert the discrete measurements into continuous measurements. Next, the signals pass through ARP uniform sampling module 510, which converts signals with different sampling rates into signals with uniform sampling rates. Then, ARP phase synchronization module 512 compensates for lead and lag times among the signals based on signal correlations. Finally, multivariate memory vectorization module 514 selects a smaller set of vectors that optimally represent the original dataset.

High-Level Process for Characterizing Following

Figure 6A:
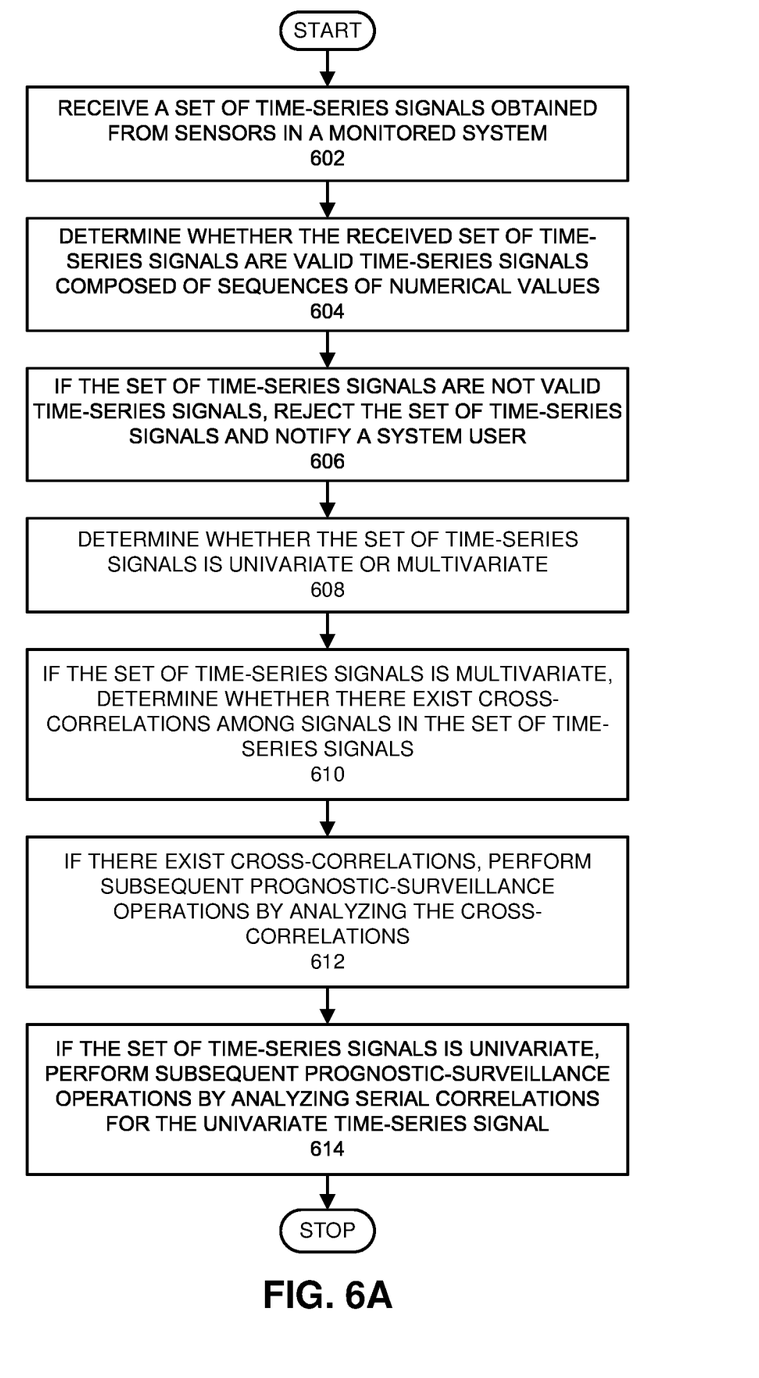
FIG. 6A presents a high-level flow chart illustrating a process for selecting a prognostic-surveillance technique to analyze a set of time-series signals in accordance with the disclosed embodiments.

FIG. 6A presents a high-level flow chart illustrating the process for selecting a prognostic-surveillance technique to analyze a set of time-series signals in accordance with the disclosed embodiments. During operation, the system receives the set of time-series signals obtained from sensors in a monitored system (step 602). Next, the system determines whether the received set of time-series signals are valid time-series signals composed of sequences of numerical values (step 604). If the set of time-series signals are not valid time-series signals, the system rejects the set of time-series signals and notifies a system user (step 606). The system then determines whether the set of time-series signals is univariate or multivariate (step 608). If the set of time-series signals is multivariate, the system determines whether there exist cross-correlations among signals in the set of time-series signals (step 610). If so, the system performs subsequent prognostic-surveillance operations by analyzing the cross-correlations (step 612). If the set of time-series signals is univariate, the system performs subsequent prognostic-surveillance operations by analyzing serial correlations for the univariate time-series signal (step 614).

Figure 6B:
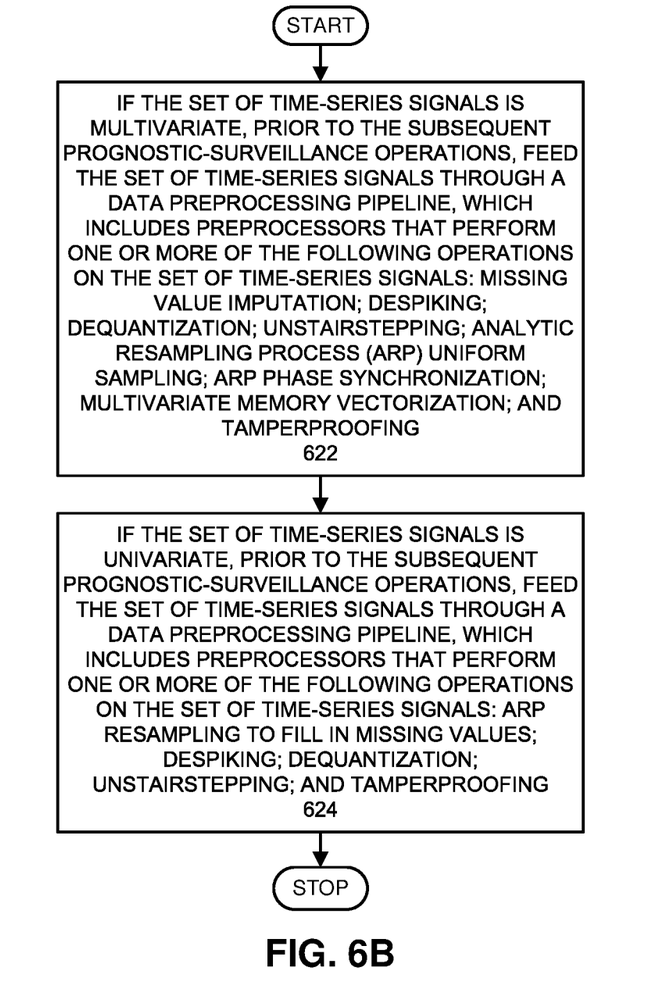
FIG. 6B presents a high-level flow chart illustrating a process for applying a data preprocessing pipeline (DPP) in accordance with the disclosed embodiments.

FIG. 6B presents a high-level flow chart illustrating a process for using a data preprocessing pipeline in accordance with the disclosed embodiments. During operation of the system, when the set of time-series signals is multivariate, prior to the subsequent prognostic-surveillance operations, the system feeds the set of time-series signals through a data preprocessing pipeline, which includes preprocessors that perform one or more of the following operations on the set of time-series signals: missing value imputation; despiking; dequantization; unstairstepping; analytic resampling process (ARP) uniform sampling; ARP phase synchronization; multivariate memory vectorization; and tamperproofing (step 622). On the other hand, if the set of time-series signals is univariate, prior to the subsequent prognostic-surveillance operations, the system feeds the set of time-series signals through a data preprocessing pipeline, which includes preprocessors that perform one or more of the following operations on the set of time-series signals: ARP resampling to fill in missing values; despiking; dequantization; unstairstepping; and tamperproofing (step 624).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically selecting a prognostic-surveillance technique to analyze a set of time-series signals, comprising:
    receiving the set of time-series signals obtained from sensors in a monitored system;
    determining whether the time-series signals in the received set of time-series signals are valid time-series signals composed of sequences of numerical values;
    when the time-series signals in the set of time-series signals are not valid time-series signals, rejecting the set of time-series signals and notifying a system user;
    when the time-series signals in the set of time-series signals are valid, determining whether the set of time-series signals is univariate or multivariate;
    when the set of time-series signals is multivariate:
        determining whether there exist cross-correlations among signals in the set of time-series signals; and
        when there exist cross-correlations, performing subsequent prognostic-surveillance operations by analyzing the cross-correlations; and
    when the set of time-series signals is univariate, performing subsequent prognostic-surveillance operations by analyzing serial correlations for the univariate time-series signal.

2. The method of claim 1, wherein when the set of time-series signals is univariate, the method further comprises:
    determining whether the univariate signal is stationary or dynamic;
    when the univariate signal is stationary, using a serial correlation technique for stationary, univariate signals to analyze the univariate signal during the subsequent prognostic-surveillance operations; and
    when the univariate signal is dynamic, using a serial correlation technique for dynamic, univariate signals to analyze the univariate signal during the subsequent prognostic-surveillance operations.

3. The method of claim 2, wherein determining whether the univariate signal is stationary or dynamic involves one of the following:
    performing a slope calculation to determine stationarity; and
    performing a Kolmogorov-Smirnov (KS) test.

4. The method of claim 2, wherein using the serial correlation technique for dynamic, univariate signals comprises using:
    a Fourier decomposition and reconstruction technique when the signal includes periodic components;
    a symbolic aggregate approximation (SAX) technique when the signal includes repeating shaped components with no periodicity; and
    a staggered-sampling/hyperSPRT technique when the signal includes no repeating patterns.

5. The method of claim 1, wherein when the set of time-series signals is multivariate, the method further comprises:
    removing signals with a significant number of missing values;
    removing flat signals;
    removing signals that lack cross-correlations with other signals;
    when at least two signals remain after removing signals, performing the subsequent prognostic-surveillance operations by analyzing the cross-correlations; and
    otherwise, rejecting the set of time-series signals and notifying a system user.

6. The method of claim 1, wherein performing the subsequent prognostic-surveillance operations by analyzing the cross-correlations involves using a multivariate state estimation technique (MSET) model to analyze the cross-correlations.

7. The method of claim 6, wherein using the MSET model to analyze the cross-correlations involves:
    using the MSET model to generate estimated values based on subsequently received time-series signals from the monitored system;
    performing a pairwise differencing operation between actual values and the estimated values for the subsequently received time-series signals to produce residuals; and
    analyzing the residuals to detect the incipient anomalies in the monitored system.

8. The method of claim 1, wherein when the set of time-series signals is multivariate, prior to the subsequent prognostic-surveillance operations, the method further comprises feeding the set of time-series signals through a data preprocessing pipeline, which includes preprocessors that perform one or more of the following operations on the set of time-series signals:
    missing value imputation;
    despiking;
    dequantization;
    unstairstepping;
    analytic resampling process (ARP) uniform sampling;
    ARP phase synchronization;
    multivariate memory vectorization; and
    tamperproofing.

9. The method of claim 1, wherein when the set of time-series signals is univariate, prior to the subsequent prognostic-surveillance operations, the method further comprises feeding the set of time-series signals through a data preprocessing pipeline, which includes preprocessors that perform one or more of the following operations on the set of time-series signals:

ARP resampling to fill in missing values;
despiking;
dequantization;
unstairstepping; and
tamperproofing.

10. A non-transitory computer-readable storage medium storing instructions that when executed by a computer cause the computer to perform a method for automatically selecting a prognostic-surveillance technique to analyze a set of time-series signals, the method comprising:
  receiving the set of time-series signals obtained from sensors in a monitored system;
  determining whether the time-series signals in the received set of time-series signals are valid time-series signals composed of sequences of numerical values;
  when the time-series signals in the set of time-series signals are not valid time-series signals, rejecting the set of time-series signals and notifying a system user;
  when the time-series signals in the set of time-series signals are valid, determining whether the set of time-series signals is univariate or multivariate;
  when the set of time-series signals is multivariate:
    determining whether there exist cross-correlations among signals in the set of time-series signals; and
    when there exist cross-correlations, performing subsequent prognostic-surveillance operations by analyzing the cross-correlations; and
  when the set of time-series signals is univariate, performing subsequent prognostic-surveillance operations by analyzing serial correlations for the univariate time-series signal.

11. The non-transitory computer-readable storage medium of claim 10, wherein when the set of time-series signals is univariate, the method further comprises:
  determining whether the univariate signal is stationary or dynamic;
  when the univariate signal is stationary, using a serial correlation technique for stationary, univariate signals to analyze the univariate signal during the subsequent prognostic-surveillance operations; and
  when the univariate signal is dynamic, using a serial correlation technique for dynamic, univariate signals to analyze the univariate signal during the subsequent prognostic-surveillance operations.

12. The non-transitory computer-readable storage medium of claim 11, wherein using the serial correlation technique for dynamic, univariate signals comprises using:
  a Fourier decomposition and reconstruction technique when the signal includes periodic components;
  a symbolic aggregate approximation (SAX) technique when the signal includes repeating shaped components with no periodicity; and
  a staggered-sampling/hyperSPRT technique when the signal includes no repeating patterns.

13. The non-transitory computer-readable storage medium of claim 10, wherein when the set of time-series signals is multivariate, the method further comprises:
  removing signals with a significant number of missing values;
  removing flat signals;
  removing signals that lack cross-correlations with other signals;
  when at least two signals remain after removing signals, performing the subsequent prognostic-surveillance operations by analyzing the cross-correlations; and
  otherwise, rejecting the set of time-series signals and notifying a system user.

14. The non-transitory computer-readable storage medium of claim 10, wherein when the set of time-series signals is multivariate, prior to the subsequent prognostic-surveillance operations, the method further comprises feeding the set of time-series signals through a data preprocessing pipeline, which includes preprocessors that perform one or more of the following operations on the set of time-series signals:
  missing value imputation;
  despiking;
  dequantization;
  unstairstepping;
  analytic resampling process (ARP) uniform sampling;
  ARP phase synchronization;
  multivariate memory vectorization; and
  tamperproofing.

15. The non-transitory computer-readable storage medium of claim 10, wherein when the set of time-series signals is univariate, prior to the subsequent prognostic-surveillance operations, the method further comprises feeding the set of time-series signals through a data preprocessing pipeline, which includes preprocessors that perform one or more of the following operations on the set of time-series signals:
  ARP resampling to fill in missing values;
  despiking;
  dequantization;
  unstairstepping; and
  tamperproofing.

16. A system that automatically selects a prognostic-surveillance technique to analyze a set of time-series signals, comprising:
  at least one processor and at least one associated memory; and
  a prognostic-surveillance mechanism that executes on the at least one processor, wherein during operation, the prognostic-surveillance mechanism:
    receives the set of time-series signals obtained from sensors in a monitored system;
    determines whether the time-series signals in the received set of time-series signals are valid time-series signals composed of sequences of numerical values;
    when the time-series signals in the set of time-series signals are not valid time-series signals, rejects the set of time-series signals and notifies a system user;
    when the time-series signals in the set of time-series signals are valid, determines whether the set of time-series signals is univariate or multivariate;
    when the set of time-series signals is multivariate:
      determines whether there exist cross-correlations among signals in the set of time-series signals; and
      when there exist cross-correlations, performs subsequent prognostic-surveillance operations by analyzing the cross-correlations; and
    when the set of time-series signals is univariate, performs subsequent prognostic-surveillance operations by analyzing serial correlations for the univariate time-series signal.

17. The system of claim 16, wherein when the set of time-series signals is multivariate, prior to the subsequent prognostic-surveillance operations, the prognostic-surveillance mechanism feeds the set of time-series signals through a data preprocessing pipeline, which includes preprocessors that perform one or more of the following operations on the set of time-series signals:
  missing value imputation;

despiking;
dequantization;
unstairstepping;
analytic resampling process (ARP) uniform sampling;
ARP phase synchronization;
multivariate memory vectorization; and
tamperproofing.

18. The system of claim 16, wherein when the set of time-series signals is univariate, prior to the subsequent prognostic-surveillance operations, the prognostic-surveillance mechanism feeds the set of time-series signals through a data preprocessing pipeline, which includes preprocessors that perform one or more of the following operations on the set of time-series signals:
ARP resampling to fill in missing values;
despiking;
dequantization;
unstairstepping; and
tamperproofing.

19. The system of claim 16, wherein when the set of time-series signals is univariate, the prognostic-surveillance mechanism further:
determines whether the univariate signal is stationary or dynamic;
when the univariate signal is stationary, uses a serial correlation technique for stationary, univariate signals to analyze the univariate signal during the subsequent prognostic-surveillance operations; and
when the univariate signal is dynamic, uses a serial correlation technique for dynamic, univariate signals to analyze the univariate signal during the subsequent prognostic-surveillance operations.

20. The system of claim 16, wherein when the set of time-series signals is multivariate, the prognostic-surveillance mechanism further:
removes signals with a significant number of missing values;
removes flat signals;
removes signals that lack cross-correlations with other signals;
when at least two signals remain after removing signals, performs the subsequent prognostic-surveillance operations by analyzing the cross-correlations; and
otherwise, rejects the set of time-series signals and notifies the system user.

* * * * *

UNITED STATES PATENT AND TRADEMARK OFFICE
CERTIFICATE OF CORRECTION

| | | |
|---|---|---|
| PATENT NO. | : 11,556,555 B2 | |
| APPLICATION NO. | : 17/081859 | |
| DATED | : January 17, 2023 | |
| INVENTOR(S) | : Gross et al. | |

It is certified that error appears in the above-identified patent and that said Letters Patent is hereby corrected as shown below:

In the Drawings

On sheet 1 of 7, in FIG. 1, and on the title page, the illustrative print figure, under Reference Numeral 122, Line 2, delete "PROGNOTIC-" and insert -- PROGNOSTIC- --, therefor.

On sheet 3 of 7, in FIG. 4A, under Reference Numeral 411, Line 2, delete "decompositon" and insert -- decomposition --, therefor.

In the Specification

In Column 5, Line 24, delete "1945." and insert -- 1945, --, therefor.

Signed and Sealed this
Seventh Day of November, 2023

Katherine Kelly Vidal
*Director of the United States Patent and Trademark Office*